(12) United States Patent
Feng et al.

(10) Patent No.: US 11,479,274 B2
(45) Date of Patent: Oct. 25, 2022

(54) METHOD FOR IMPROVING FATIGUE RESISTANCE PERFORMANCE OF LOCOMOTIVE RUBBER-METAL PAD AND LOCOMOTIVE RUBBER-METAL PAD

(71) Applicant: Zhuzhou Times New Material Technology Co., Ltd.

(72) Inventors: Wansheng Feng, Hunan (CN); Ke Yuan, Hunan (CN); Qingmei Liu, Hunan (CN); Bin Zhao, Hunan (CN)

(73) Assignee: Zhuzhou Times New Material Technology Co., Ltd., Hunan (CN)

( * ) Notice: Subject to any disclaimer, the term of this patent is extended or adjusted under 35 U.S.C. 154(b) by 450 days.

(21) Appl. No.: 16/617,504

(22) PCT Filed: May 22, 2019

(86) PCT No.: PCT/CN2019/087997
§ 371 (c)(1),
(2) Date: Nov. 27, 2019

(87) PCT Pub. No.: WO2019/237897
PCT Pub. Date: Dec. 19, 2019

(65) Prior Publication Data
US 2021/0354733 A1 Nov. 18, 2021

(30) Foreign Application Priority Data

Jun. 13, 2018 (CN) .......................... 201810608800.X

(51) Int. Cl.
*B61F 5/08* (2006.01)
*F16F 3/12* (2006.01)

(52) U.S. Cl.
CPC . *B61F 5/08* (2013.01); *F16F 3/12* (2013.01)

(58) Field of Classification Search
CPC ...... B61F 5/08; B61F 5/00; B61F 5/02; B61F 5/04; B61F 5/06; B61F 5/12; B61F 5/142;
(Continued)

(56) References Cited

U.S. PATENT DOCUMENTS

| 2,165,702 A | * | 7/1939 | Haushalter | ................ B61F 5/08 403/228 |
| 3,279,779 A | * | 10/1966 | Kloss | ........................ F16F 3/12 267/153 |

(Continued)

FOREIGN PATENT DOCUMENTS

| CN | 201677888 | 12/2010 |
| CN | 202243512 | 5/2012 |

(Continued)

OTHER PUBLICATIONS

"International Search Report (Form PCT/ISA/210) of PCT/CN2019/087997," dated Aug. 8, 2019, pp. 1-5.

*Primary Examiner* — Christopher Garft
*Assistant Examiner* — Michael McDuffie
(74) *Attorney, Agent, or Firm* — JCIP Global Inc.

(57) ABSTRACT

A method for improving fatigue resistance performance of a locomotive rubber-metal pad and the locomotive rubber-metal pad improve the fatigue resistance performance of the rubber-metal pad and prevent rubber and metal from being torn during running by changing a structure of the rubber and the metal of the rubber-metal pad and adjusting a shape and position relationship between the rubber and the metal. The shape and position relationship between the rubber and the metal is adjusted by adjusting thickness of a rubber layer between the rubber and the metal of the rubber-metal pad so that the rubber layer has variable thickness. A rubber layer diameter of each layer is a variable diameter by adjusting a (Continued)

size of the rubber layer diameter between the rubber and the metal of the rubber-metal pad.

7 Claims, 2 Drawing Sheets

(58) Field of Classification Search
 CPC ..... B61F 5/305; F16F 3/08; F16F 3/10; F16F 3/12
 USPC ....... 248/580, 608, 609, 560, 562, 566, 568, 248/570, 575, 610, 613, 619, 621; 105/182.1, 197.05, 209, 217
 See application file for complete search history.

(56) References Cited

U.S. PATENT DOCUMENTS

| | | | | |
|---|---|---|---|---|
| 3,375,000 | A * | 3/1968 | Seamands | F16F 3/12 267/162 |
| 3,556,503 | A * | 1/1971 | van Moss, Jr. | F16F 1/52 267/153 |
| 4,761,925 | A * | 8/1988 | Fukahori | B32B 7/022 267/141.1 |
| 4,830,347 | A * | 5/1989 | Langshaw | F16F 3/10 267/141.1 |
| 4,830,927 | A * | 5/1989 | Fukahori | B32B 25/04 428/521 |
| 5,065,555 | A * | 11/1991 | Kobori | F16F 7/12 248/580 |
| 5,458,313 | A * | 10/1995 | Tie | F16L 3/20 248/580 |
| 6,511,037 | B1 * | 1/2003 | Newman | F16F 1/44 267/140.3 |
| 7,182,306 | B2 * | 2/2007 | Tsutsumida | B60K 5/1291 248/609 |
| 8,746,663 | B2 * | 6/2014 | Mitsch | F03D 80/00 267/141.1 |
| 8,967,337 | B2 * | 3/2015 | Senecal | B66D 1/54 267/140 |
| 2012/0318165 | A1 * | 12/2012 | Xu | B61F 3/02 105/197.05 |
| 2019/0032741 | A1 * | 1/2019 | George | F16C 11/083 |
| 2021/0316769 | A1 * | 10/2021 | Yuan | B61F 5/08 |
| 2021/0331720 | A1 * | 10/2021 | Liu | B61F 5/08 |

FOREIGN PATENT DOCUMENTS

| | | | |
|---|---|---|---|
| CN | 202243512 U | * | 5/2012 |
| CN | 204055811 | | 12/2014 |
| CN | 105447232 A | * | 3/2016 |
| CN | 107244331 | | 10/2017 |
| CN | 108639087 | | 10/2018 |
| CN | 108749847 | | 11/2018 |
| CN | 108757796 | | 11/2018 |
| CN | 208559368 | | 3/2019 |
| DE | 1817187 | | 8/1969 |
| JP | H08021475 | | 1/1996 |

* cited by examiner

METHOD FOR IMPROVING FATIGUE RESISTANCE PERFORMANCE OF LOCOMOTIVE RUBBER-METAL PAD AND LOCOMOTIVE RUBBER-METAL PAD

CROSS-REFERENCE TO RELATED APPLICATION

This application is a continuation of international PCT application serial no. PCT/CN2019/087997, filed on May 22, 2019, which claims the priority benefit of Chinese application no. 201810608800.X, filed on Jun. 13, 2018. The entirety of each of the above-mentioned patent applications is hereby incorporated by reference herein and made a part of this specification.

BACKGROUND

Technical Field

The present invention relates to a primary or secondary elastic vibration reduction method and device of a locomotive, and in particular to an elastic vibration reduction method and device for improving horizontal fatigue resistance performance of a locomotive rubber-metal pad and preventing the rubber of the rubber-metal pad from being torn. The elastic vibration reduction method and device of the locomotive rubber-metal pad can substantially improve the fatigue resistance performance and durability of the locomotive rubber-metal pad and prevent a rubber layer of the rubber-metal pad from generating a tearing phenomenon, and belong to the technical field of elastic vibration reduction of the locomotive.

Description of Related Art

A side bearing of the rubber-metal pad is widely applied to a secondary suspension of the locomotive, is a connecting device between a locomotive body and a bogie, and has the effects of evenly distributing the upper mass of the locomotive to the bogie to ensure the even distribution of axle weight and the normal transmission of a horizontal force and enabling the bogie to rotate relative to the locomotive body when the locomotive passes in a curve to alleviate the impact of an uneven route on the locomotive and ensure that the locomotive has good running smoothness and stability. Therefore, the stiffness performance and the fatigue performance of the side bearing have an important influence on the dynamic performance and reliability of the locomotive.

Rubber-metal pads are mainly classified into two types according to their shapes: rectangular rubber-metal pads and circular rubber-metal pads. Recently, a spherical circular rubber-metal pad improved on the circular rubber-metal pad has appeared. The circular rubber-metal pad is the most widely used form and its structure is shown in FIG. 1. It can be known from the actual application that the fatigue conditions of the side bearing of the rubber-metal pad are very bad, the vertical load is large (the maximum load reaches 300k N), and the shear displacement is large (the maximum displacement reaches ±195 mm). Under the compression-shear composite load, the stress of the rubber layer far exceeds a rubber acceptable range. Thus, the rubber-metal pad is easy to fatigue during use, and especially during running, it is easy to tear the rubber-metal layer. It is very necessary to improve.

There is no report about patent literature with the same technology as the present invention through patent retrieval. There are several patents related to the present invention:

1. Invention patent application with patent No. of CN201710454346.2, title of "a secondary elastic suspension vibration reduction device of conical rubber-metal pad and permanent magnet spring combination" and applicant of Southwest Jiaotong University. The patent application discloses a secondary elastic suspension vibration reduction device of conical rubber-metal pad and permanent magnet spring combination arranged between a bogie frame of a rail vehicle and a vehicle body (or swing bolster) and used for transmitting three-direction loads between the vehicle body (or swing bolster) and the frame and attenuating the vibration of a vehicle system. The device includes a permanent magnet spring and a conical rubber-metal pad. The upper end of the permanent magnet spring of the present invention is vertically connected with the conical rubber-metal pad structure in series so that the system obtains required longitudinal, transverse and vertical stiffness. The longitudinal and transverse stiffness is mainly supplied by the conical rubber-metal pad, and the vertical stiffness is mainly supplied by the permanent magnet spring. The specific magnetic circuit design of the permanent magnet spring can supply nonlinear vertical stiffness with good vibration isolation performance.

2. Utility model patent with patent No. of CN201420455519.4, title of "a rubber-metal pad for a rail vehicle" and applicant of Zhuzhou Times New Material Technology Co., Ltd. The patent discloses a rubber-metal pad for a rail vehicle, including a top plate, a partition plate, rubber layers and a bottom plate. The rubber-metal pad is formed by vulcanizing the top plate, the partition plate, the bottom plate and the rubber layers. The rubber layers are arranged among the top plate, the partition plate and the bottom plate, characterized in that the longitudinal sections of the contact surfaces of the rubber layers with the top plate, the partition plate and the bottom plate are upwardly convex trapezoids.

Through careful analysis on the above patents, although the patents relate to the rubber-metal pad and propose some improved technical solutions, through careful analysis, the proposed rubber-metal pads and manufacturing methods therefor do not improve the fatigue resistance performance of the existing rubber-metal pad. Thus, the tearing phenomenon still appears during use, which remains to be further studied.

SUMMARY

The purpose of the present invention is to propose a method and product thereof for effectively improving fatigue resistance performance of a rubber-metal pad in view of the problem of each tearing of rubber in a primary or secondary rubber-metal pad for rail transit, so as to prevent the rubber layer of the rubber-metal pad from being torn during use and satisfy the need of site use of a locomotive.

To achieve the purpose, the present invention provides a method for improving fatigue resistance performance of a locomotive rubber-metal pad, which improves the fatigue resistance performance of the rubber-metal pad and prevents rubber and metal from being torn during running by changing the structure of the rubber and the metal of the rubber-metal pad and adjusting the shape and position relationship between the rubber and the metal. The shape and position relationship between the rubber and the metal can be adjusted by adjusting the thickness of the rubber layer between rubber and metal of the rubber-metal pad so that the rubber layer has variable thickness. The rubber layer diameter of each layer is a variable diameter by adjusting the size of the rubber layer diameter between the rubber and the metal of the rubber-metal pad. The fatigue resistance performance of the rubber-metal pad is improved by adjusting the thickness and the diameter of the rubber layer.

Further, the thickness of the rubber layer between the rubber and the metal of the rubber-metal pad is adjusted by adopting a variable-thickness structure for the rubber layer of the rubber-metal pad according to the finite element analysis of the stress of the rubber-metal pad, so that each layer of rubber is subjected to a more uniform stress under horizontal deformation through the variable-thickness rubber layer, so as to improve the fatigue resistance performance of the rubber-metal pad.

Further, the rubber layer of the rubber-metal pad adopts the variable-thickness structure, i.e., the rubber layer of the rubber-metal pad uses a middle layer as a reference layer, the middle layer is thickest, the thickness of the rubber layer is gradually reduced from the middle layer to the upper or lower side respectively, and the top or bottom rubber layer is thinnest.

Further, the thickness of the rubber layer is gradually reduced from the middle layer to the upper or lower side respectively, i.e., according to the rubber layer thickness 1 of the middle layer, the rubber layer adjacent to the middle layer is reduced in thickness by 0.1-0.3 with respect to the middle layer, and the rubber layer of an outer layer is further reduced by 0.1-0.3 with respect to the rubber layer of the inner layer, and so on, until the outermost rubber layer is decreased progressively, so as to reduce the thickness of the rubber layer to improve the strain at horizontal deformation of the layers on the end and near the end.

Further, the size of the rubber layer diameter between the rubber and the metal of the rubber-metal pad is adjusted by adopting a variable-diameter rubber layer of which the rubber layer diameter of the middle layer is smallest and the diameter of the outer rubber layer is larger.

Further, the variable-diameter rubber layer takes the diameter of the rubber layer of the middle layer as a reference to make the diameter of the upper or lower rubber layer larger so that a connecting line of inner arc apexes of the rubber layers of the whole rubber-metal pad forms an inward concave arc, and the fatigue resistance performance of the rubber-metal pad is improved by adjusting the curvature of the arc.

A locomotive rubber-metal pad includes an upper backing plate, a lower backing plate, metal partition plates and rubber layers. The metal partition plates and the rubber layers are arranged between the upper backing plate and the lower backing plate. The rubber layers and the metal layers are staggered to form a rubber-metal pad of rubber and metal with composite layers of rubber and metal, characterized in that the thickness of the rubber layers is variable and the diameter of the rubber layers is also variable.

Further, the rubber layer uses a middle layer as a reference layer, the middle layer is thickest, the thickness of the rubber layers is gradually reduced from the middle layer to the upper or lower side respectively, and the top or bottom rubber layer is thinnest.

Further, the thickness of the rubber layer is gradually reduced from the middle layer to the upper or lower side respectively, i.e., according to the rubber layer thickness 1 of the middle layer, the rubber layer adjacent to the middle layer is reduced in thickness by 0.1-0.3 of the thickness of the middle layer with respect to the middle layer, and the rubber layer of an outer layer is further reduced in thickness by 0.1-0.3 with respect to the rubber layer of the inner layer, and so on, until the outermost rubber layer is decreased progressively, so as to reduce the thickness of the rubber layer to improve the strain at horizontal deformation of the layers on the end and near the end.

Further, the variable-diameter rubber layer adopts rubber layers with different diameters of which the rubber layer diameter of the middle layer is smallest and the diameter of the outer rubber layer is larger. The variable-diameter rubber layer takes the diameter of the rubber layer of the middle layer as a reference to make the diameter of the upper or lower rubber layer larger so that a connecting line of inner arc apexes (a point with a smallest diameter on each rubber layer) of the rubber layers of the whole rubber-metal pad forms an inward concave arc, and the fatigue resistance performance of the rubber-metal pad is improved by adjusting the curvature of the arc.

The present invention has the advantages that:

According to the finite element analysis on the tearing phenomenon of the rubber layer of the existing rubber-metal pad for the locomotive by the applicant, the rubber-metal pad for the locomotive is actually placed on a bogie to carry the weight of the locomotive body. At the same time, a horizontal displacement is provided in motion of the locomotive. For example, when the locomotive body passes through a curve, the horizontal motion of the locomotive body and the bogie is provided by the rubber-metal pad. In addition, horizontal acting forces are produced for the rubber-metal pad in other motion of the locomotive such as braking and acceleration. The acting forces are mainly reflected as vertical, horizontal and torsional effects on a rubber-metal pad product. Because the use condition of the locomotive is bad, the rubber layers on the top end and the bottom end are cracked when the current product is used for 1-3 years. For this, from the finite element analysis, the problem that the rubber-metal pad for the locomotive has uneven stress and strain among different layers is found, and stress and strain close to the end surface are largest. Therefore, the main improvement direction is to improve the rubber stress of the end layer.

The present invention adopts a rubber layer with variable thickness and variable diameter so that the entirety of the integral structure of the rubber-metal pad has a shape similar to a sandglass. By increasing the diameter of the upper layer and the lower layer and decreasing the thickness of the end layer, the stiffness of the layer is increased, thereby improving the stress and the strain of the layer. In this way, the stress of rubber of each layer can be effectively changed so that the stress of each of the rubber layers is basically uniform, thereby improving the strain of the end layer. In this way, the fatigue performance of the whole rubber-metal pad can be greatly improved, so that the end layer has higher strength and smaller deformation when the rubber moves in the horizontal direction to transfer the strain to the middle layer to reduce the stress of the end layer and so that the distribution of the stress of each layer is more even, thereby improving the whole fatigue resistance performance, effectively preventing the end rubber layer from being torn and also improving the life of the rubber of each layer.

DESCRIPTION OF THE EMBODIMENTS

The present invention is further described below in combination with the drawings and the specific embodiments.

Embodiment 1

Figure 1:
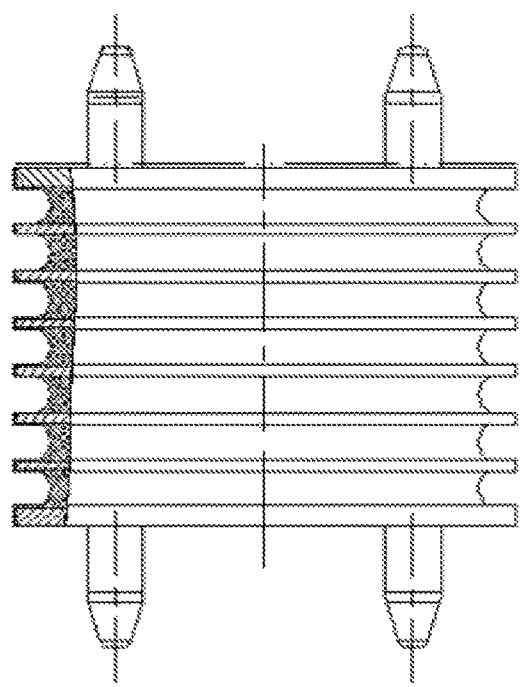
FIG. 1 is a structural schematic diagram of the existing locomotive rubber-metal pad.
Figure 2:
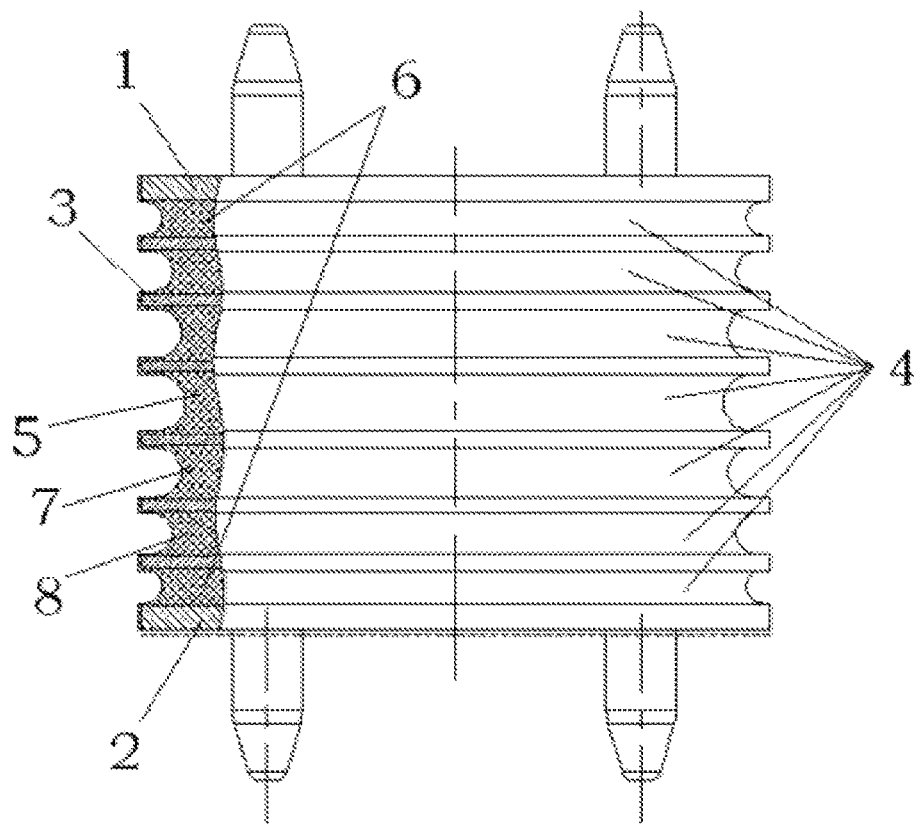
FIG. 2 is a structural schematic diagram of an embodiment of the present invention.
Figure 3:
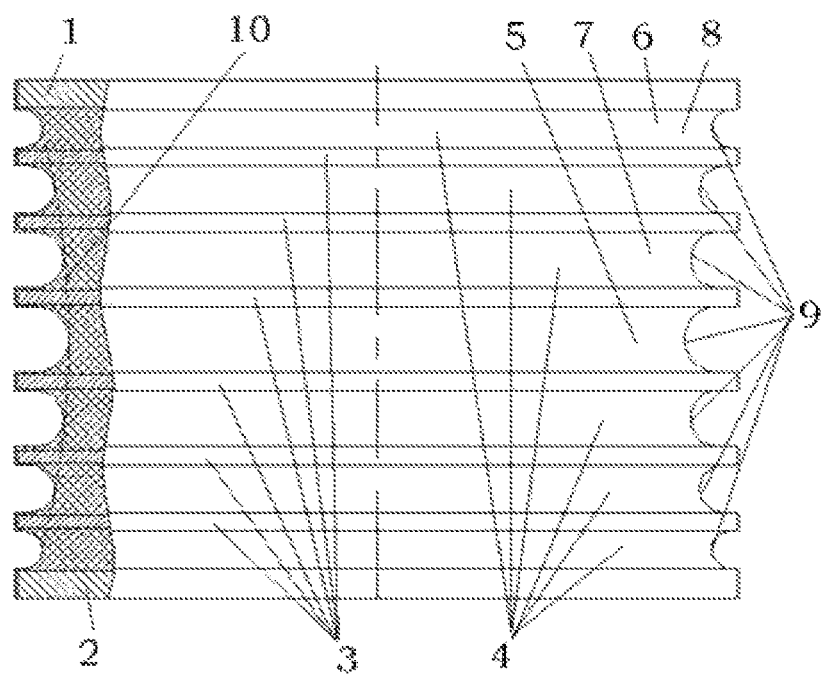
FIG. 3 is a structural schematic diagram of a profile of a rubber layer of the present invention.

It can be seen from FIG. 2 and FIG. 3 that the present invention relates to a locomotive rubber-metal pad which includes an upper backing plate 1, a lower backing plate 2, metal partition plates 3 and rubber layers 4. The metal partition plates 3 and the rubber layers 4 are arranged between the upper backing plate 1 and the lower backing plate 2. The rubber layers 4 and the metal layers 3 are staggered to form a rubber-metal pad of rubber and metal with composite layers of rubber and metal, characterized in that the thickness of the rubber layers 4 is variable and the diameter of the rubber layers 4 is also variable.

The rubber layer 4 uses a middle layer 5 as a reference layer, the middle layer 5 is thickest, the thickness of the rubber layers is gradually reduced from the middle layer 5 to the upper or lower side respectively, and the top or bottom rubber layer 6 is thinnest.

The thickness of the rubber layer is gradually reduced from the middle layer 5 to the upper or lower side respectively, i.e., according to the rubber layer thickness 1 of the middle layer, an adjacent layer 7 adjacent to the middle layer 5 is reduced in thickness by 0.1-0.2 of the thickness of the middle layer with respect to the middle layer 5, and an outer layer 8 is further reduced in thickness by 0.1-0.2 with respect to the rubber layer of the inner layer, and so on, until the outermost rubber layer is decreased progressively, so as to reduce the thickness of the rubber layer to improve the strain of the end layer.

The variable-diameter rubber layer adopts rubber layers with different diameters of which the rubber layer diameter of the middle layer 5 is smallest and the diameter of the outer rubber layer is larger. The variable-diameter rubber layer takes the diameter of the rubber layer of the middle layer as a reference to make the diameter of the outer or upper or lower rubber layer larger so that a connecting line of inner arc apexes 9 (a point with a smallest diameter on each rubber layer) of the rubber layers of the whole rubber-metal pad forms an inward concave arc 10 which is a transversely zygomorphic inward concave circular arc, and the fatigue resistance performance of the rubber-metal pad is improved by adjusting the curvature of the arc. The arc is a quadric arc.

Embodiment 2

The basic structure of embodiment 2 is the same as that of embodiment 1, and is only different in manufacturing modes. A locomotive rubber-metal pad includes an upper backing plate, a lower backing plate, metal partition plates and rubber layers. The metal partition plates and the rubber layers are arranged between the upper backing plate and the lower backing plate. The rubber layers and the metal layers are staggered to form a rubber-metal pad of rubber and metal with composite layers of rubber and metal, characterized in that the thickness of the rubber layers is variable and the diameter of the rubber layers is also variable.

Further, the rubber layer uses a middle layer as a reference layer, the middle layer is thickest, the thickness of the rubber layers is gradually reduced from the middle layer to the upper or lower side respectively, and the top or bottom rubber layer is thinnest.

Further, the thickness of the rubber layer is gradually reduced from the middle layer to the upper or lower side respectively, i.e., according to the rubber layer thickness 1 of the middle layer, the rubber layer adjacent to the middle layer is reduced in thickness by 0.2-0.3 with respect to the middle layer, and the rubber layer of an outer layer is further reduced in thickness by 0.2-0.3 with respect to the rubber layer of the inner layer, and so on, until the outermost rubber layer is decreased progressively, so as to reduce the thickness of the rubber layer to improve the strain at horizontal deformation of the layers on the end and near the end.

Further, the variable-diameter rubber layer adopts rubber layers with different diameters of which the rubber layer diameter of the middle layer is smallest and the diameter of the outer rubber layer is larger. The variable-diameter rubber layer takes the diameter of the rubber layer of the middle layer as a reference to make the diameter of the outer or upper or lower rubber layer larger so that a connecting line of inner arc apexes of the rubber layers of the whole rubber-metal pad forms an inward concave arc which is a vertically asymmetrical inward concave circular arc, and the fatigue resistance performance of the rubber-metal pad is improved by adjusting the curvature of the arc.

The above described embodiments only clearly and completely describe the technical solution of the present invention in combination with drawings. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

It can be seen through the above embodiments that the present invention also relates to a method for improving fatigue resistance performance of a locomotive rubber-metal pad, which improves the fatigue resistance performance of the rubber-metal pad and prevents rubber and metal from being torn during running by changing the structure of the rubber and the metal of the rubber-metal pad and adjusting the shape and position relationship between the rubber and the metal. The shape and position relationship between the rubber and the metal can be adjusted by adjusting the thickness of the rubber layer between rubber and metal of the rubber-metal pad so that the rubber layer has variable thickness. The rubber layer diameter of each layer is a variable diameter by adjusting the size of the rubber layer diameter between the rubber and the metal of the rubber-metal pad. The fatigue resistance performance of the rubber-metal pad is improved by adjusting the thickness and the diameter of the rubber layer.

Further, the thickness of the rubber layer between the rubber and the metal of the rubber-metal pad is adjusted by adopting a variable-thickness structure for the rubber layer of the rubber-metal pad according to the finite element analysis of the stress of the rubber-metal pad, so that each layer of rubber is subjected to a more uniform stress through the variable-thickness rubber layer, so as to improve the fatigue resistance performance of the rubber-metal pad.

Further, the rubber layer of the rubber-metal pad adopts the variable-thickness structure, i.e., the rubber layer of the rubber-metal pad uses a middle layer as a reference layer, the middle layer is thickest, the thickness of the rubber layer is gradually reduced from the middle layer to the upper or lower side respectively, and the top or bottom rubber layer is thinnest.

Further, the thickness of the rubber layer is gradually reduced from the middle layer to the upper or lower side respectively, i.e., according to the rubber layer thickness 1 of the middle layer, the rubber layer adjacent to the middle layer is reduced in thickness by 0.1-0.2 of the thickness of the middle layer with respect to the middle layer, and the rubber layer of an outer layer is further reduced in thickness by 0.1-0.2 with respect to the rubber layer of the inner layer, and so on, until the outermost rubber layer is decreased progressively, so as to reduce the thickness of the rubber layer to improve the strain of the end layer.

Further, the size of the rubber layer diameter between the rubber and the metal of the rubber-metal pad is adjusted by adopting a variable-diameter rubber layer of which the rubber layer diameter of the middle layer is smallest and the diameter of the outer rubber layer is larger.

Further, the variable-diameter rubber layer takes the diameter of the rubber layer of the middle layer as a reference to make the diameter of the outer or upper or lower rubber layer larger so that a connecting line of inner arc apexes of the rubber layers of the whole rubber-metal pad forms an inward concave arc, and the fatigue resistance performance of the rubber-metal pad is improved by adjusting the curvature of the arc.

The present invention has the advantages that:

According to the finite element analysis on the tearing phenomenon of the rubber layer of the existing rubber-metal pad for the locomotive by the applicant, the rubber-metal pad for the locomotive is actually placed on a bogie to carry the weight of the locomotive body. At the same time, a horizontal displacement is provided in motion of the locomotive. For example, when the locomotive body passes through a curve, the horizontal motion of the locomotive body and the bogie is provided by the rubber-metal pad. In addition, horizontal acting forces are produced for the rubber-metal pad in other motion of the locomotive such as braking and acceleration. The acting forces are mainly reflected as vertical, horizontal and torsional effects on a rubber-metal pad product. Because the use condition of the locomotive is bad, the rubber layers on the top end and the bottom end are cracked when the current product is used for 0.5-3 years. For this, from the finite element analysis, the problem that the rubber-metal pad for the locomotive has uneven stress and strain among different layers is found, and stress and strain close to the end surface are largest. Therefore, the main improvement direction is to improve the rubber stress of the end layer.

The present invention adopts a rubber layer with variable thickness and variable diameter so that the entirety of the integral structure of the rubber-metal pad has a shape similar to a sandglass. By increasing the diameter of the upper layer and the lower layer and decreasing the thickness of the end layer, the stiffness of the layer is increased, thereby improving the stress and the strain of the layer. In this way, the stress of rubber of each layer can be effectively changed so that the stress of each of the rubber layers is basically uniform, thereby improving the strain of the end layer. In this way, the fatigue performance of the whole rubber-metal pad can be greatly improved, so that the end layer has higher strength and smaller deformation when the rubber moves in the horizontal direction to transfer the strain to the middle layer to reduce the stress of the end layer and so that the distribution of the stress of each layer is more even, thereby improving the whole fatigue resistance performance and effectively preventing the end rubber layer from being torn.

What is claimed is:

1. A method for improving fatigue resistance performance of a locomotive rubber-metal pad, wherein improving the fatigue resistance performance of the rubber-metal pact and preventing rubber and metal from being torn during running by changing a structure of the rubber and the metal of the rubber-metal pad and adjusting a shape and position relationship between the rubber and the metal, the shape and position relationship between the rubber and the metal is adjusted by adjusting a thickness of a rubber layer between the rubber and the metal of the rubber-metal pad in the normal direction of the rubber-metal pad so that the rubber layer has variable thickness, a rubber layer diameter of each layer is a variable diameter by adjusting a size of the rubber layer diameter between the rubber and the metal of the rubber-metal pad, the fatigue resistance performance of the rubber-metal pad is improved by adjusting the thickness and a diameter of the rubber layer, wherein the rubber layer of the rubber-metal pad adopts the variable-thickness structure, the rubber layer of the rubber-metal pad uses a middle layer as a reference layer, in the normal direction of the rubber-metal pad, the middle layer is thickest, the thickness of the rubber layer is gradually reduced from the middle layer to an upper or lower side respectively, and a top or bottom rubber layer is thinnest, wherein the size of the rubber layer diameter between the rubber and the metal of the rubber-metal pad is adjusted by adopting a variable-diameter rubber layer, the rubber layer diameter of a middle layer is smallest and the rubber layer diameter of an outer layer is larger.

2. The method for improving fatigue resistance performance of the locomotive rubber-metal pad according to claim 1, wherein the thickness of the rubber layer between the rubber and the metal of the rubber-metal pad is adjusted by adopting a variable-thickness structure for the rubber layer of the rubber-metal pad according to a finite element analysis of a stress of the rubber-metal pad, so that each layer of rubber is subjected to a more uniform stress under horizontal deformation through the variable-thickness rubber layer, so as to improve the fatigue resistance performance of the rubber-metal pad.

3. The method for improving fatigue resistance performance of the locomotive rubber-metal pad according to claim 1, wherein the thickness of the rubber layer is gradually reduced from the middle layer to the upper or lower side respectively, according to the thickness of the rubber layer of the middle layer is D, the thickness of the rubber layer adjacent to the middle layer is 0.7D-0.9D, and the thickness of the rubber layer of an outer layer is 0.49D-0.81D, and the thickness of the rubber layer of an outermost layer is 0.343D-0.727D.

4. The method for improving fatigue resistance performance of the locomotive rubber-metal pad according to claim 1, wherein the variable-diameter rubber layer takes the diameter of the rubber layer of the middle layer as a reference to make the diameter of the rubber layer of the outer or upper or lower layer larger, so that a connecting line of inner arc apexes of the rubber layers of the whole rubber-metal pad forms an inward concave arc, and the fatigue resistance performance of the rubber-metal pad is improved by adjusting a curvature of the inward concave arc.

5. A locomotive rubber-metal pad comprises an upper backing plate, a lower backing plate, metal partition plates and rubber layers, the metal partition plates and the rubber layers are arranged between the upper backing plate and the lower backing plate, each of the rubber layers and each of the metal layers are staggered to form a rubber-metal pad of rubber and metal with composite layers of rubber and metal, wherein thickness of the rubber layers in the normal direction of the rubber-metal pad is variable and diameter of the rubber layers is also variable, wherein the thickness of the rubber layer uses a middle layer as a reference layer, in the normal direction of the rubber-metal pad, the middle layer is thickest, the thickness of the rubber layers is gradually reduced from the middle layer to an upper or lower side respectively, and a top or bottom rubber layer is thinnest, wherein a variable-diameter rubber layer adopts rubber layers with different diameters, a rubber layer diameter of the middle layer is smallest and a rubber layer diameter of an upper or lower layer is larger.

6. The locomotive rubber-metal pad according to claim 5, wherein the thickness of the rubber layer is gradually reduced from the middle layer to the upper or lower side respectively, according to the thickness of the rubber layer of the middle layer is D, the thickness of the rubber layer adjacent to the middle layer is 0.7D-0.9D, and the thickness of the rubber layer of an outer layer is 0.49D-0.81D, and the thickness of the rubber layer of an outermost layer is 0.343D-0.727D.

7. The locomotive rubber-metal pad according to claim 5, wherein the variable-diameter rubber layer takes the diameter of the rubber layer of the middle layer as a reference to make the diameter of the rubber layer of the upper or lower layer larger, so that a connecting line of inner arc apexes of the rubber layers of the whole rubber-metal pad forms an inward concave arc, and the fatigue resistance performance of the rubber-metal pad is improved by adjusting a curvature of the inward concave arc.

* * * * *